(12) United States Patent
Kim et al.

(10) Patent No.: US 12,658,509 B2
(45) Date of Patent: Jun. 16, 2026

(54) SECONDARY BATTERY

(71) Applicant: LG Energy Solution, Ltd., Seoul (KR)

(72) Inventors: Sangdeuk Kim, Daejeon (KR); Jung Shik Oh, Daejeon (KR); Ga Young Baek, Daejeon (KR); Xing Jin, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 678 days.

(21) Appl. No.: 17/922,677

(22) PCT Filed: Sep. 28, 2021

(86) PCT No.: PCT/KR2021/013266
§ 371 (c)(1),
(2) Date: Nov. 1, 2022

(87) PCT Pub. No.: WO2022/097918
PCT Pub. Date: May 12, 2022

(65) Prior Publication Data
US 2023/0268590 A1     Aug. 24, 2023

(30) Foreign Application Priority Data

Nov. 9, 2020     (KR) ........................ 10-2020-0148820

(51) Int. Cl.
H01M 50/105      (2021.01)
H01M 50/184      (2021.01)
(Continued)

(52) U.S. Cl.
CPC ....... H01M 50/105 (2021.01); H01M 50/184 (2021.01); H01M 50/186 (2021.01); H01M 50/193 (2021.01); H01M 50/342 (2021.01)

(58) Field of Classification Search
CPC ............. H01M 50/184; H01M 50/105; H01M 50/3425
See application file for complete search history.

(56) References Cited

U.S. PATENT DOCUMENTS 11,613,053 B2 *   3/2023   Oh ...................... H01M 50/105
                                                           429/176
2009/0053585 A1   2/2009   Nakazawa
                    (Continued)

FOREIGN PATENT DOCUMENTS

CN        101894970 A      11/2010
CN        101904030 A      12/2010
                    (Continued)

OTHER PUBLICATIONS

International Search Report for PCT/KR2021/013266 mailed Jan. 10, 2022. 3 pgs.
(Continued)

*Primary Examiner* — Dah-Wei D. Yuan
*Assistant Examiner* — Pin Jan Wang
(74) *Attorney, Agent, or Firm* — Lerner David LLP

(57)     ABSTRACT

A secondary battery includes an electrode assembly in a pouch case, the pouch case includes a first case part having a first accommodating part in which a part of the electrode assembly is embedded, and a second case part having a second accommodating part in which the remaining part of the electrode assembly is accommodated, the first case part and the second case part contact each other along an edge portion surrounding the first and second accommodating parts and are sealed by a sealing part having a band shape on at least a part of the edge portion, the sealing part includes a first sealing part having a first width and a second sealing part having a second width smaller than the first width, and a central portion of the second sealing part in a longitudinal direction coincides with a central portion of a long side of the electrode assembly.

9 Claims, 7 Drawing Sheets

(51) Int. Cl.

| | |
|---|---|
| *H01M 50/186* | (2021.01) |
| *H01M 50/193* | (2021.01) |
| *H01M 50/342* | (2021.01) |

(56) References Cited

U.S. PATENT DOCUMENTS

| | | | |
|---|---|---|---|
| 2010/0291423 A1* | 11/2010 | Hideo | H01M 50/3425 |
| | | | 429/82 |
| 2011/0104527 A1 | 5/2011 | Choi et al. | |
| 2014/0272488 A1 | 9/2014 | Kim et al. | |
| 2015/0026969 A1* | 1/2015 | Yasooka | H01M 50/105 |
| | | | 29/623.2 |
| 2016/0197316 A1 | 7/2016 | Park et al. | |
| 2017/0170437 A1 | 6/2017 | Lee et al. | |
| 2021/0143503 A1* | 5/2021 | Jeong | H01M 50/105 |

FOREIGN PATENT DOCUMENTS

| | | | | |
|---|---|---|---|---|
| CN | 103975461 A | 8/2014 | | |
| CN | 104115302 A | 10/2014 | | |
| CN | 105981196 A | 9/2016 | | |
| EP | 2262033 A1 | 12/2010 | | |
| EP | 2772960 A1 | 9/2014 | | |
| EP | 2816631 A1 | 12/2014 | | |
| JP | 2003132868 A | 5/2003 | | |
| JP | 2009146812 A | 7/2009 | | |
| JP | 2010267593 A | 11/2010 | | |
| JP | 2013105742 A | 5/2013 | | |
| JP | 2013165038 A | 8/2013 | | |
| JP | 2015-505138 A | 2/2015 | | |
| JP | 2017506412 A | 3/2017 | | |
| KR | 20090016279 A | * 2/2009 | ........ | H01M 10/0583 |
| KR | 20090064041 A | * 6/2009 | ........ | H01M 10/0525 |
| KR | 101074022 B1 | 10/2011 | | |
| KR | 20120060314 A | 6/2012 | | |
| KR | 20150096325 A | 8/2015 | | |
| KR | 20160046477 A | 4/2016 | | |
| KR | 20160111614 A | * 9/2016 | ........ | H01M 10/0525 |
| KR | 20200055680 A | 5/2020 | | |
| WO | 2007-043392 A1 | 4/2007 | | |

OTHER PUBLICATIONS

Search Report dated May 27, 2024 from Office Action for Chinese Application No. 202180028437.4 issued May 29, 2024. 3 pgs.

Extended European Search Report including Written Opinion for Application No. 21889383.2 dated Jan. 31, 2024, pp. 1-7.

\* cited by examiner

SECONDARY BATTERY

CROSS-REFERENCE TO RELATED APPLICATION

This application is a national stage entry under 35 U.S.C. § 371 of International Application No. PCT/KR2021/013266, filed on Sep. 28, 2021, which claims priority to Korean Patent Application No. 10-2020-0148820, filed on Nov. 9, 2020, the entire contents of which are hereby incorporated herein by reference in their entireties.

TECHNICAL FIELD

The present invention relates to a secondary battery, and more particularly, to a secondary battery which is in a pouch-type and has improved stability.

BACKGROUND ART

As technology development and demand for mobile devices increase, the demand for secondary batteries as an energy source is rapidly increasing. Accordingly, many studies have been conducted on secondary batteries that can meet various needs.

Secondary batteries are attracting a lot of attention as an energy source for power devices, such as electric bicycles, electric vehicles, and hybrid electric vehicles, as well as mobile devices, such as mobile phones, digital cameras, and notebook computers.

A small battery pack in which one battery cell is packed is used for small devices, such as mobile phones and cameras, but a medium-sized or large-sized battery pack in which a battery pack in which two or more battery cells are connected in parallel and/or in series is packed is used in middle to large-sized devices, such as notebook computers and electric vehicles.

For the secondary battery, there is a high demand for a prismatic secondary battery and a pouch-type secondary battery that are applicable to products, such as mobile phones, with a thin thickness in terms of shape. In the case of a prismatic lithium secondary battery, it is advantageous to protect the electrode assembly from external impact, and the liquid injection process is easy, but it is difficult to reduce the volume because the shape is fixed. On the other hand, in the case of a pouch-type lithium secondary battery, there are no restrictions on shape and size, so the pouch-type lithium secondary battery is suitable for manufacturing thin cells, and the pouch-type lithium secondary battery is easily assembled through thermal fusion, and easily releases gas or liquid when abnormal behavior occurs, so that there is a high advantage of high safety.

However, in the pouch-type secondary battery, decomposition of the electrolyte may occur due to factors, such as overcharging, exposure to high temperature, and internal short circuit, and accordingly, a large amount of gas may be generated, and in this case, a swelling phenomenon in which the battery case swells may occur due to the generation of the gas in the battery case.

This swelling phenomenon may cause a high pressure inside the sealed battery case and further promote the decomposition of the electrolyte to further lead to explosion of the battery cell. In addition, the central portion of the battery case swells due to the gas, which causes a shape deformation of the battery cell, thereby having a problem of the occurrence of an electrical short.

Therefore, in order to solve this problem, when the swelling phenomenon occurs, it is necessary to efficiently discharge the gas generated inside the battery case to the outside to ensure safety.

DISCLOSURE

Technical Problem

The technical problem of the exemplary embodiments is to provide a secondary battery which is a pouch-type and is capable of preventing explosion by safely discharging gas in an intended direction even if a large amount of gas is generated inside the secondary battery.

However, the problem to be solved in the exemplary embodiments of the present invention is not limited to the foregoing problem, and may be variously extended in the scope of the technical spirit included in the present invention.

Technical Solution

A secondary battery according to an exemplary embodiment of the present invention includes: an electrode assembly; and a pouch case in which the electrode assembly is embedded, in which the pouch case includes a first case part formed with a first accommodating part in which a part of the electrode assembly is embedded, and a second case part formed with a second accommodating part in which the remaining part of the electrode assembly is accommodated, the first case part and the second case part are in contact with each other in an edge portion surrounding the first and second accommodating parts and are sealed by a sealing part formed in a band shape on at least a part of the edge portion, the sealing part includes a first sealing part having a first width and a second sealing part having a second width smaller than the first width, and a central portion of the second sealing part in a longitudinal direction coincides with a central portion of a long side of the electrode assembly.

The sealing part may further include a first inclined portion which connects the first sealing part and the second sealing part and has a shape inclined toward the electrode assembly from the outside of the pouch case, and a second inclined portion which connects the first sealing part and the second sealing part and has a shape inclined toward the outside of the pouch case from the electrode assembly. A length of the first inclined portion may be larger than a length of the second inclined portion.

The second width may be ¼ or less of the first width.

A width of the edge portion may be maintained constant at a place at which the first sealing part is located and a place at which the second sealing part is located.

Each of the first case part and the second case part may include a base layer, a metal layer, and a sealing layer, and the sealing part may be a region in which a sealing layer of the first case part and a sealing layer of the second part are thermally fused to each other and integrally formed.

The sealing layer may include a thermoplastic resin.

The electrode assembly may include a pair of long sides facing each other, and the second sealing part may be located only to correspond to any one long side of the pair of long sides.

The electrode assembly may include a pair of long sides facing each other, and the second sealing part may be located to correspond to both long sides of the pair of long sides.

When thermal runaway occurs inside the pouch case, the second sealing part may act as a vent part of the generated gas.

A battery module according to another exemplary embodiment of the present invention includes the foregoing secondary battery.

Advantageous Effects

According to the exemplary embodiments, it is possible to provide the secondary battery with improved safety, which is a pouch type and is capable of preventing explosion by inducing gas to be safely discharged in an intended direction even if a large amount of gas is generated inside the pouch-type secondary battery.

MODE FOR INVENTION

Figure 1:
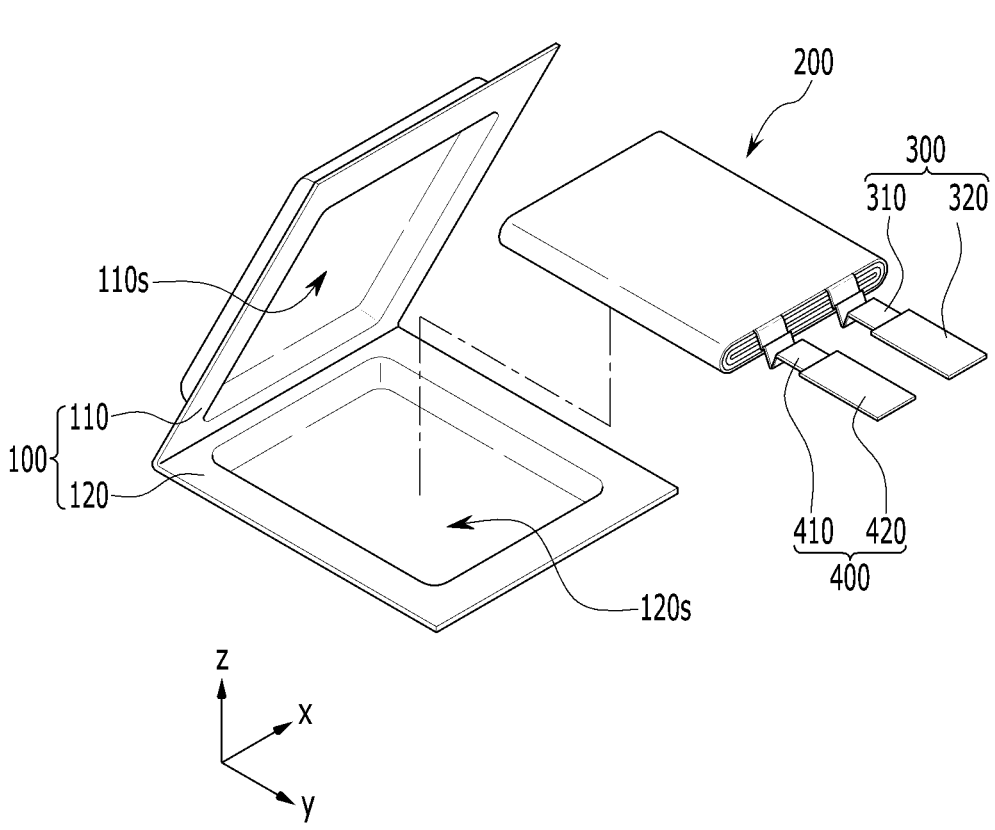
FIG. 1 is an exploded perspective view illustrating a secondary battery according to an exemplary embodiment of the present invention.

In the following detailed description, only certain exemplary embodiments of the present invention have been shown and described, simply by way of illustration. However, the present invention can be variously implemented and is not limited to the following embodiments.

Accordingly, the drawings and description are to be regarded as illustrative in nature and not restrictive. Like reference numerals designate like elements throughout the specification.

In addition, the size and thickness of each configuration shown in the drawings are arbitrarily shown for understanding and ease of description, but the present invention is not limited thereto. In the drawings, the thickness of layers, films, panels, regions, etc., are exaggerated for clarity. In the drawings, for understanding and ease of description, the thickness of some layers and areas is exaggerated.

Further, It will be understood that when an element such as a layer, film, region, or substrate is referred to as being "on" another element, it can be directly on the other element or intervening elements may also be present. In contrast, when an element is referred to as being "directly on" another element, there are no intervening elements present. Further, when an element is "on" a reference portion, the element is located above or below the reference portion, and it does not necessarily mean that the element is located "on" in a direction opposite to gravity.

In addition, unless explicitly described to the contrary, the word "comprise", and variations such as "comprises" or "comprising", will be understood to imply the inclusion of stated elements but not the exclusion of any other elements.

Figure 2:
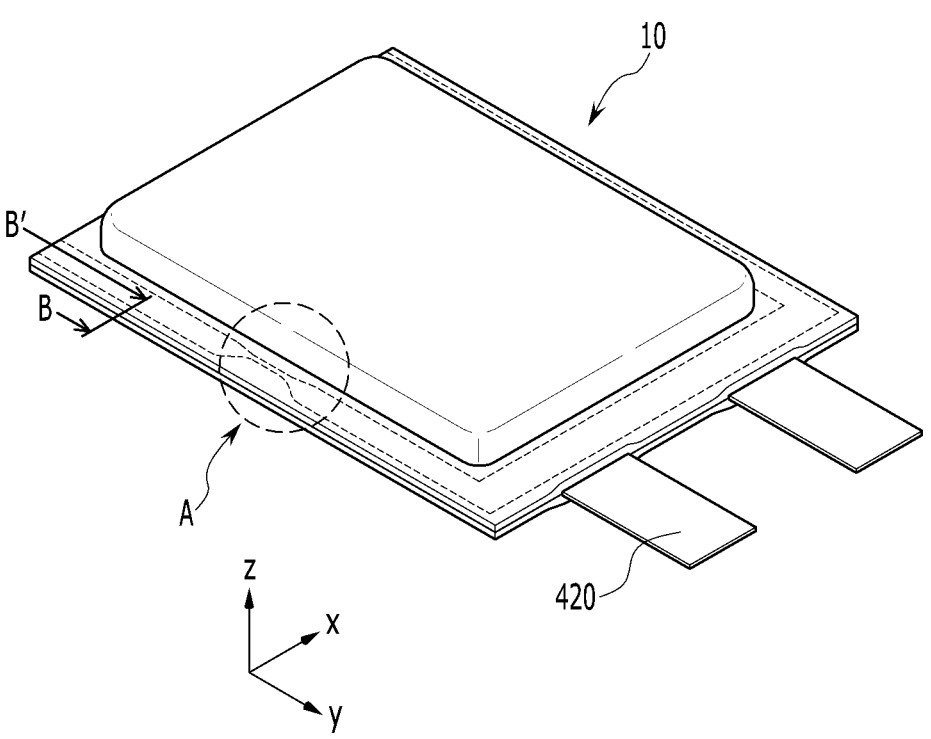
FIG. 2 is as diagram illustrating an assembling state of the secondary battery of FIG. 1.
Figure 3:
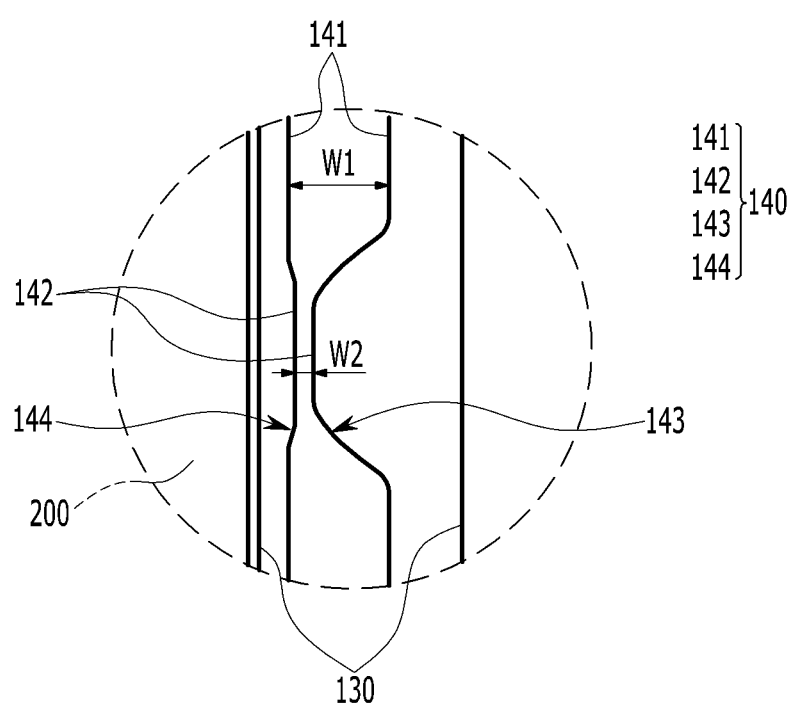
FIG. 3 is an enlarged cross-sectional view of part A of FIG. 2.
Figure 4:
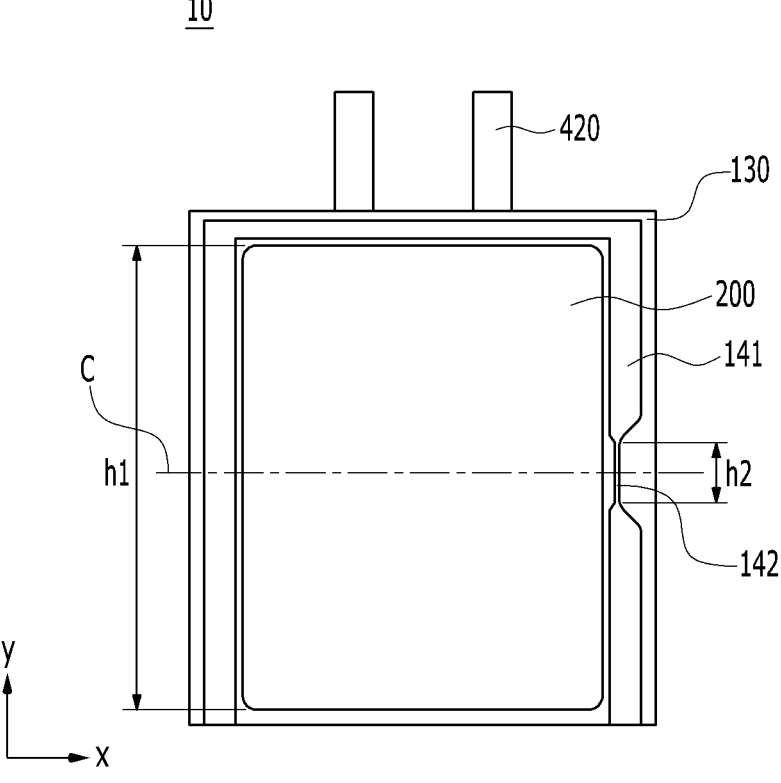
FIG. 4 is a diagram schematically illustrating the secondary battery of FIG. 2 viewed from the front.
Figure 5:
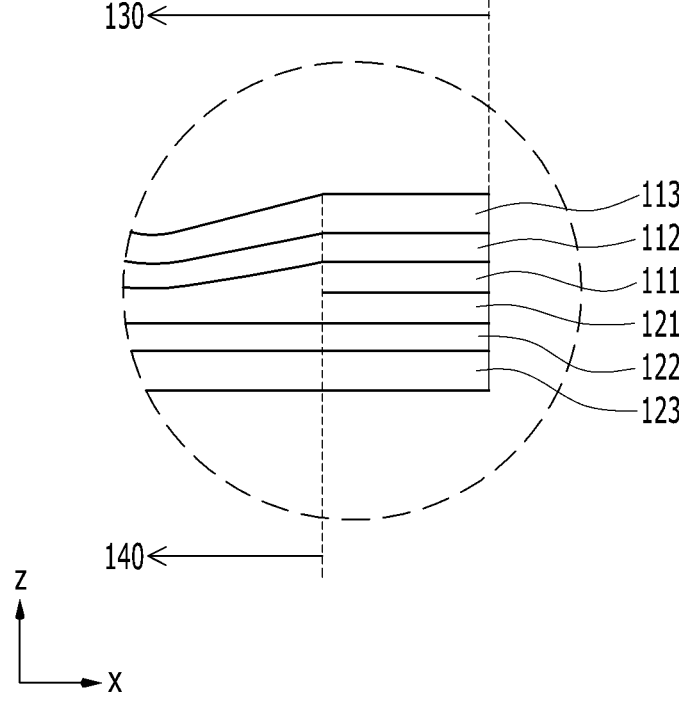
FIG. 5 is a cross-sectional view taken along line B-B'.

Further, in the entire specification, when it is referred to as "on a plane" it means when a target part is viewed from above, and when it is referred to as "on a cross-section", it means when the cross-section obtained by cutting a target part vertically is viewed from the side FIG. 1 is an exploded perspective view illustrating a secondary battery according to an exemplary embodiment of the present invention, FIG. 2 is as diagram illustrating an assembling state of the secondary battery of FIG. 1, FIG. 3 is an enlarged cross-sectional view of part A of FIG. 2, FIG. 4 is a diagram schematically illustrating the secondary battery of FIG. 2 viewed from the front, and FIG. 5 is a cross-sectional view taken along line B-B'.

First, referring to FIGS. 1 and 2, a secondary battery 10 according to an exemplary embodiment of the present invention includes a pouch case 100 and an electrode assembly 200. The pouch case 100 includes a first case part 110 and a second case part 120. FIG. 1 illustrates that the first case part 110 and the second case part 120 are connected to each other and integrally formed, but the first case part 110 and the second case part 120 may be separated from each other. The shape of the pouch case 100 is not limited to that illustrated in FIG. 1, and any shape is possible as long as the shape is capable of accommodating and sealing the electrode assembly 200.

The electrode assembly 200 may be configured in a form in which a positive electrode plate and a negative electrode plate are disposed with a separator interposed therebetween. In this case, the electrode assembly 200 may have a structure in which one positive electrode plate and one negative electrode plate are wound with a separator interposed therebetween, or a structure in which a plurality of positive electrode plates and a plurality of negative electrode plates are stacked with a separator interposed therebetween. The positive electrode plate and the negative electrode plate may be formed in a structure in which an active material slurry is applied to an electrode current collector, respectively, and the slurry may be typically formed by stirring an active material, a conductive material, a binder, and a plasticizer in a state in which a solvent is added.

In the electrode assembly 200, there may be an uncoated region to which the slurry is not applied in the electrode plate, and an electrode tab corresponding to each electrode plate may be formed in the uncoated region. Specifically, as illustrated in FIG. 1, a positive electrode tab 310 may be attached to the positive electrode plate of the electrode assembly 200, and a negative electrode tab 410 may be attached to the negative electrode plate of the electrode assembly 200. The positive electrode tab 310 and the negative electrode tab 410 are electrically connected to a positive electrode lead 320 and a negative electrode lead 420 to form electrode terminals 300 and 400. In this case, as illustrated in FIG. 2, the positive electrode lead 320 and the negative electrode lead 420 may be drawn out of the pouch case 100.

The first case part 110 and the second case part 120 of FIG. 1 include a first accommodating part 110s and a second accommodating part 120s each having a concave shape, respectively, and the first accommodating part 110s and the second accommodating part 120s may accommodate the electrode assembly 200 and the electrolyte.

The secondary battery 10 of FIG. 2 exemplarily illustrates a pouch-type secondary battery in which the first case part 110 and the second case part 120 illustrated in FIG. 1 are bonded to each other and sealed.

FIG. 3 is an enlarged cross-sectional view of part A of FIG. 2, and FIG. 4 is a diagram illustrating the secondary battery of FIG. 2 viewed from the front. Referring to FIG. 3, the first case part 110 and the second case part 120 configuring the pouch case 100 according to the exemplary embodiment of the present invention include a sealing part 140 formed on an edge portion 130 of the pouch case 100 surrounding the first accommodating part 110s and the second accommodating part 120s in which the electrode assembly 200 of FIG. 1 is accommodated. The sealing part 140 is formed in a band shape on at least a part of the edge portion 130 along the edge of the pouch case 100, whereby the first case part 110 and the second case part 120 may be joined to each other. The first case part 110 and the second case part 120 are thermally fused to form the sealing part 140, so that the pouch case 100 may be sealed.

FIG. 5 is a cross-sectional view along line B-B' of FIG. 2. As illustrated in FIG. 5, the first case part 110 includes a first base layer 113, a second metal layer 112, and a first sealing layer 111 sequentially stacked from the outside, and the second case part 120 includes a second base layer 123, a second metal layer 122, and a second sealing layer 121 sequentially stacked from the outside.

The first base layer 113 and the second base layer 123 may be made of an insulating material, such as polyethylene terephthalate (PET) resin or nylon resin, to ensure insulation performance between the secondary battery and the outside and moldability. The first metal layer 112 and the second metal layer 122 may include one selected from the group consisting of copper, aluminum, nickel, iron, carbon, chromium, manganese, and alloys thereof. The first sealing layer 111 and the second sealing layer 121 may include a thermoplastic resin, such as polypropylene (PP).

The first case part 110 and the second case part 120 are bonded so that the first sealing layer 111 and the second sealing layer 121 are in contact with each other at the edge portion 130. In this state, the first sealing layer 111 and the second sealing layer 121 are integrally coupled to each other by being pressurized and thermally fused by a heated mold or the like so as to correspond to the sealing part 140, to form the sealing layer 140, so that the pouch case 100 may be sealed.

In this case, the sealing part 140 includes a first sealing part 141 having a first width W1 and a second sealing part 142 having a second width W2 that is smaller than the first width W1. In addition, the second sealing part 142 may be formed so that the central portion of the length h2 matches the length h1 of the long side of the electrode assembly 200 accommodated in the first accommodating part 110s and the second accommodating part 120s. That is, in FIG. 4, the center of the long side of the electrode assembly 200 and the center of the length of the second sealing part 142 are both located on the center line C.

The second sealing part 142 may act as a vent part for gas generated when the temperature inside the pouch case 100 rises. That is, when exposed to high temperature conditions, the separator inside the electrode assembly 200 contracts, and the battery expands or the electrode is deformed due to vaporization of the electrolyte, thereby causing a short circuit between the positive electrode and the negative electrode. In particular, when the electrode and the current collector come into contact, the battery reaches a thermal runaway state in which heat generation is greater than heat discharge and the battery is ignited. However, in this case, even if a short circuit occurs between the positive electrode and the negative electrode, when all the electrolyte inside the battery is drained, the movement of ions and electrons in the battery is restricted, so that ignition may be prevented. That is, safety may be improved by inducing the electrolyte to be vaporized and escape at a faster time than batteries in the related art.

In the exemplary present embodiment, the second sealing portion 142 having a smaller width than that of another sealing part, that is, the first sealing portion 141, acts as a vent part, so that the vent of the vaporized electrolyte proceeds quickly, thereby preventing ignition and explosion to improve safety. That is, when the battery expands, the portion where deformation and expansion occurs most is the central portion C in the longitudinal direction of the electrode assembly 200, and the second sealing part 142 is disposed in response to this, the vent through the second sealing part 142 may be induced more quickly.

In this case, the second sealing part 142 may be disposed to be more biased toward the electrode assembly 200 from the center of the first sealing part 141 in the width direction. That is, as illustrated in FIG. 3, the sealing part 140 includes a first inclined portion 143 which connects the first sealing part 141 and the second sealing part 142 and has a shape inclined toward the electrode assembly 200 from the outside of the pouch case 100, and includes a second inclined portion 144 which connects the first sealing part 141 and the second sealing part 142 and has having a shape inclined toward the outside of the pouch case 100 from the electrode assembly 200. Also, in this case, the length of the first inclined portion 143 may be formed to be longer than the length of the second inclined portion 144.

With such a structure, the second sealing part 142 is disposed to be relatively close to the inner side, so that even though the width W2 of the second sealing part 142 is small, the sealing part 142 may have a sufficient sealing effect. In addition, by including the second inclined portion 144 inside, the gas generated inside may be more easily induced toward the corresponding portion, that is, the second inclined portion 144 in the recessed form, so that it is possible to more quickly induce breakage and gas discharge of the sealing part 142.

The second width W2 of the second sealing part 142 may have a value of ¼ or less of the first width W1 of the first sealing part 141, but is not particularly limited. When the second width W2 of the second sealing part 142 is too small, sealing performance may be deteriorated, and preferably, the second width W2 of the second sealing part 142 may be ⅛ or more and ¼ or less of the first width W1 of the first sealing part 141.

In addition, as described above, the second sealing part 142 is not a configuration obtained through deformation, such as cutting, of the edge portion 130, but is the configuration obtained by deforming only a pressing form of a corresponding portion, that is, reducing the width of the mold, during the sealing process by thermal fusion. Therefore, the width of the edge portion 130 is the same in the first sealing part 141 and the second sealing part 142, and it is possible to simply obtain the configuration of the second sealing part 142 by changing only the width to be thermally fused, that is, the width of the sealing part 140.

Figure 6:
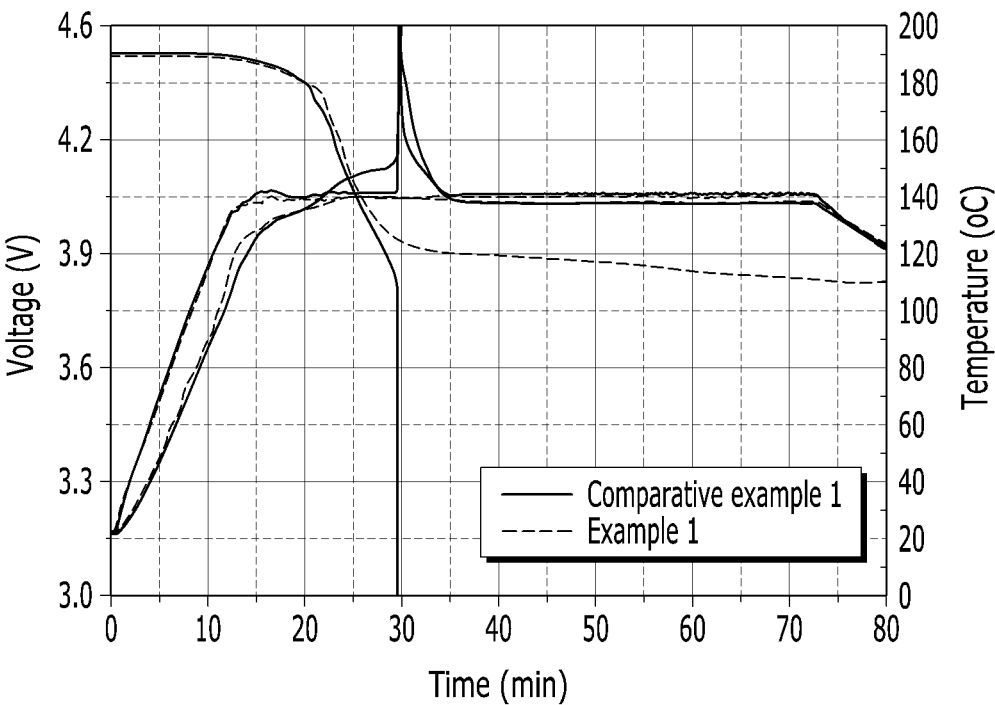
FIG. 6 is a graph illustrating the results of an experiment conducted for the secondary batteries of the example and the comparative example of the present invention left at a high temperature.

As described above, an experiment was conducted in which the secondary battery 10 according to the example of the present invention and the secondary battery of the comparative example were exposed to high temperatures, and the results are illustrated in FIG. 6.

FIG. 6 is a graph illustrating the results of an experiment conducted for the secondary batteries of the example and the comparative example of the present invention left at a high temperature.

In the secondary battery 10 according to the example, as illustrated in FIGS. 2 to 4, the second sealing part 142 was formed, and in the secondary battery according to the comparative example, the second sealing part 142 was not formed, and a sealing part of a constant width was formed.

As a result of leaving the secondary battery at a temperature of 140° C., as illustrated in FIG. 6, it was confirmed that an explosion occurred when about 30 minutes had elapsed in the case of the comparative example. On the other hand, in the secondary battery 10 of the example, no explosion occurred when 80 minutes had elapsed, so it was confirmed that the electrolyte was rapidly discharged even when the battery was exposed to high temperature, thereby improving safety.

Figure 7:
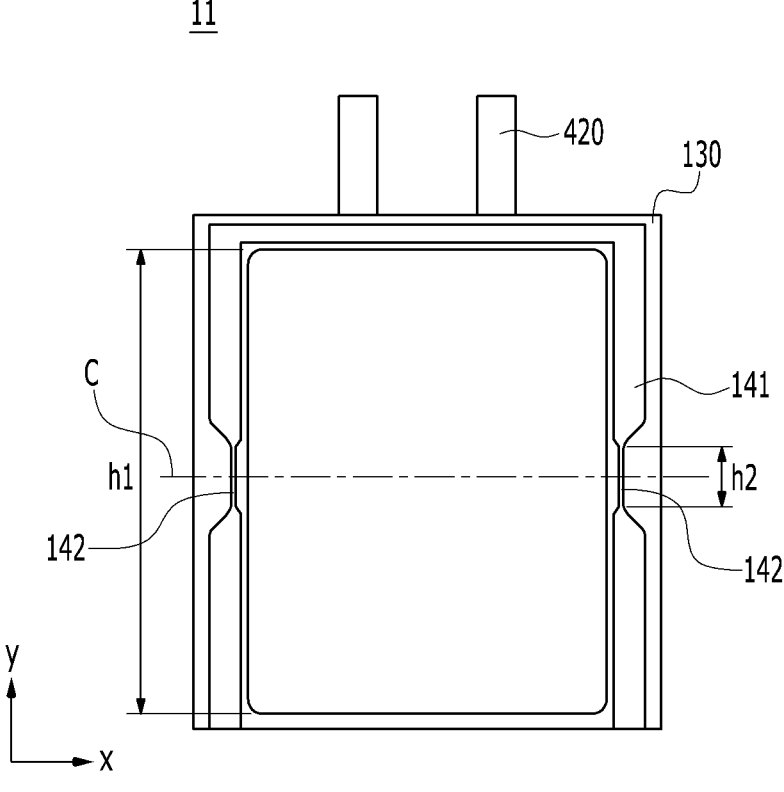
FIG. 7 is a diagram schematically illustrating the secondary battery according to another exemplary embodiment of the present invention viewed from the front.

FIG. 7 is a diagram schematically illustrating the secondary battery according to another exemplary embodiment of the present invention viewed from the front.

In the secondary battery 11 according to another exemplary embodiment of the present invention, only the number of second sealing parts 142 is different and the rest of the configuration is the same as that of the secondary battery 10 according to the exemplary embodiment, so that the description of overlapping configurations will be omitted.

As illustrated in FIG. 7, in the secondary battery 11 according to another exemplary embodiment, the second sealing part 142 is positioned to correspond to both long sides of the pair of long sides facing each other of the electrode assembly 200. In this case, even when gas is rapidly generated inside the secondary battery 11, vent of the gas may occur at both sides at the same time, so that the electrolyte may be discharged more quickly. Accordingly, it is possible to prevent an explosion at a high temperature, thereby improving safety.

Meanwhile, a plurality of pouch-type secondary batteries according to the exemplary embodiment of the present invention may be assembled to form a battery module, and one or more of the battery modules may be packaged in a pack case to form a battery pack.

The above-described battery module and battery pack including the same may be applied to various devices. As the device, transport means, such as an electric bicycle, an electric vehicle, and a hybrid vehicle, are applicable, but the present invention is not limited thereto, and the present invention is applicable to various devices capable of using a battery module and a battery pack including the same, which also belongs to the scope of the present invention.

Although an exemplary embodiment of the present invention has been described in detail, the scope of the present invention is not limited by the embodiment. Various changes and modifications using the basic concept of the present invention defined in the accompanying claims by those skilled in the art shall be construed to belong to the scope of the present invention.

EXPLANATION OF REFERENCE NUMERALS
AND SYMBOLS

100: Pouch case
200: Electrode assembly
130: Edge portion
140: Sealing part
141: First sealing part
142: Second sealing part

The invention claimed is:

1. A secondary battery, comprising:
an electrode assembly; and
a pouch case in which the electrode assembly is embedded,
wherein the pouch case includes a first case part having a first accommodating part therein in which a first part of the electrode assembly is accommodated, and a second case part having a second accommodating part in which a remaining part of the electrode assembly is accommodated,
the first case part and the second case part contact each other along an edge portion of the pouch case surrounding the first and second accommodating parts and are sealed by a sealing part formed in a band shape extending along at least a part of the edge portion,
the sealing part includes a first sealing part having a first width and a second sealing part having a second width smaller than the first width, a width of the edge portion of the pouch case being the same in the first sealing part and the second sealing part, and
a central portion of the second sealing part in a longitudinal direction of the pouch case is aligned with a central portion of a long side of the electrode assembly,
wherein the sealing part further includes a first inclined portion which connects the first sealing part and the second sealing part and has a shape inclined toward the electrode assembly from an outside of the pouch case, and a second inclined portion which connects the first sealing part and the second sealing part and has a shape inclined toward the outside of the pouch case from the electrode assembly, and
wherein a length of the first inclined portion is greater than a length of the second inclined portion, an entirety of the first inclined portion being inclined relative to an outer surface of the first sealing part.

2. The secondary battery of claim 1, wherein the second width is ¼ or less of the first width.

3. The secondary battery of claim 1, wherein the edge portion of the pouch case has a constant width at a place at which the first sealing part is located and a place at which the second sealing part is located.

4. The secondary battery of claim 1, wherein each of the first case part and the second case part includes a base layer, a metal layer, and a sealing layer, and the sealing part is a region in which a sealing layer of the first case part and a sealing layer of the second case part are thermally fused to each other.

5. The secondary battery of claim 4, wherein the sealing layer includes a thermoplastic resin.

6. The secondary battery of claim 1, wherein the electrode assembly includes a pair of long sides opposite from each other, and the second sealing part is located only adjacent to one long side of the pair of long sides.

7. The secondary battery of claim 1, wherein the electrode assembly includes a pair of long sides opposite from each other, and the second sealing part includes two second sealing part portions located adjacent to first and second long sides of the pair of long sides, respectively.

8. The secondary battery of claim 1, wherein the second sealing part is configured to act as a vent part of the pouch case that is configured to vent a generated gas when thermal runaway occurs inside of the pouch case.

9. A battery module including the secondary battery of claim 1.

* * * * *